United States Patent Office 3,380,842
Patented Apr. 30, 1968

3,380,842
DECORATIVE COMPOSITION AND A
PROCESS FOR ITS USE
Carter A. Watson, Bellingham, Wash., assignor to
Georgia-Pacific Corporation, Portland, Oreg., a corporation of Georgia
No Drawing. Filed Sept. 20, 1963, Ser. No. 310,458
11 Claims. (Cl. 117—27)

This invention relates to a decorative composition, a process for its use, and an article so decorated.

In recent years, decorative coatings to assimilate snow and ice have been widely used, especially during the Christmas season when Christmas trees and other decorations are so-coated. For a decorative coating composition to be salable to the public, it is necessary that the composition be such that it may be easily applied to the item or article to be decorated by simple methods. This is necessary not only for the purpose of reducing the cost of application but also to enable the consumer to apply the decorative coatings as he wishes without having to use special equipment or flammable solvents. A simple method of application is also desirable where the decorative coatings are applied commercially to trees and such in large quantities. The cost of application must be maintained at a minimum in order to have the decorated items available to the consuming public at a reasonable price.

A simple and cheap method which has been used for applying the decorative coating is to spray the material using simple air blowing equipment which can be found in most homes such as vacuum cleaners and the like. In this method of application, the composition in a dry state is blown by air from a container and intermixed with a water spray which may be supplied by employing a spray nozzle. The decorative composition intermixes with the water and upon impinging upon the item adheres to the article. In such application, it is necessary that the constituents in the decorative composition be wetted instantly, since a very short time elapses from the time the composition is deposited upon the article being decorated. In addition to the constituents being instantly wettable with water, the composition must have good tack properties and adhere to the object being decorated as well as to itself so that various amounts of the composition can be applied to the object to assimilate a different amount of snow coverage. Another important characteristic is that the composition once applied should be water resistant. During the winter, rainy or damp weather is often encountered in many parts of the country. It may be necessary at times to carry these items, for example, a decorated Christmas tree, through the rain or to display the item exposed to atmospheric conditions such as on the porch of the home or on the door where the decoration is subjected to contact with rain or real snow.

Therefore, it is an object of this invention to provide a process for coating of articles with a moisture resistant composition assimilating snow and ice. A further object is to provide a composition having all of the requirements set forth above and an article coated with the composition.

The above and other objects are attained according to this invention by coating the articles with a decorative composition comprising a flock agent, a water-soluble adhesive, such as starch and dextrin, and a water-soluble urea-aldehyde resin. The composition may be applied by blowing the mixture in a dry state with an air stream and impinging a water stream or spray upon the composition stream to wet the mixture prior to contact with the article or surface to be decorated. The coating thus obtained has the required tack and, upon drying, produces a water-resistant surface which will permit the exposure of the flocked article to rain or other atmospheric conditions without the composition dropping from the surface. Heretofore, to provide the required water resistance, it was necessary to spray the flocked or decorated surface or object with a water resistant coating such as a vinyl paint. This procedure involves additional processing and also often alters the appearance of the decorative coating. By employing a decorative composition containing an urea-formaldehyde resin, a coating is obtained which is water-resistant without the addition of paint-type coatings to change the appearance.

It was found in the work leading to this invention that upon the addition of the resin to the decorative composition, the resin or some reaction product of the resin migrates to the surface to form a water-resistant surface. This surface repels the moisture and maintains the composition intact when exposed to moisture. When an object coated with thick layers of the composition containing the resin is immersed in water, the interior of the composition may absorb some water but the outer surface will remain relatively firm, retains the shape of the flock, and keeps it from falling from the surface.

Further, by the addition of the resin, a wet snow appearance can be obtained with a relatively small amount of adhesive. This may be due to the migration of the resin or some reaction product to the surface. Normally, to obtain a wet snow appearance upon a tree or a surface, it is necessary to use a mixture containing at least 20 weight percent and many times over 50 weight percent of adhesive. However, with the addition of a small amount of the resin, a wet appearance can be obtained with as little as 10 weight percent adhesive.

The adhesives which may be used in the composition are the water-soluble adhesives normally employed for binding fibrous materials. Light colored adhesives, such as starch and dextrin and mixtures thereof, are generally used. These adhesives do not adversely effect the color of the product, if a white coating to assimilate snow is desired. A pregelatinized or a modified starch from potatoes or flour is usually preferred. However, an unmodified starch or starch from other sources may also be used. The amount of adhesive employed may be widely varied. Generally, an amount of from 5 to 15% is sufficient for most applications. At times, up to about 25% or higher may be employed, but normally the advantage obtained with the larger amount is not sufficiently significant to warrant its use.

A sufficient amount of resin is used to obtain the desired water resistance. Generally, the composition contains at least 0.1 weight percent of the resin with an amount in the range of about 1 to 15 weight percent being most commonly employed. While the amount of resin may be increased over 15 weight percent, up to about 25 weight percent, usually an amount of from 3 to 10 weight percent of the composition is preferred. The water-soluble urea-aldehyde resin such as, for example, urea-formaldehyde, urea-acetaldehyde, and dimethylol urea are preferred with urea-formaldehyde being used most of the time due to its availability. The urea-aldehyde resin does not have to be necessarily purified. It may be what is often referred to as a "modified" urea-aldehyde resin which may contain a small amount of melamine.

The flock or flock agents are usually fibrous materials which will adhere to the article to be decorated and give the appearance of snow. Cellulose and cellulose derivative flocks such as wood pulp, cotton, and cellulose fibers such as rayon and cellulose acetate may be used. Other vegetable fibers such as jute and the like may be employed as well as synthetic fibers as polyester fibers of polyvinylidene fibers. In addition, other materials such as asbestos, glass wool and chopped feathers may also be used. However, since it is generally desirable to have the decorative composition represent white snow, the product most often used is cotton or wood pulp. While it is desirable most of the time to use the product in a white color, it is not necessary to do so. Coloring may be added to give different shades of colors, if desired.

Since the decorated composition is applied to Christmas trees or other decorations which are employed in the home, fire-retardants and fire-proofing agents are generally added. While the fire-proofing agents may be incorporated in the water or the composition, it is generally desirable to use a "dry" fire-proofing agent such as borax or a salt of mono-basic phosphate such as ammonium, calcium, or other salts. Other fire retardants such as the ammonium chloride and other chlorides may also be employed. The fire-proofing agents generally used are acidic so that when these are intermixed with the dry decorative composition, they serve a dual purpose of also being a catalyst for the resin.

The amount of the fire-retardant used will depend to a certain extent upon the particular agent employed as well as the extent of fire-resistance desired. An amount in the range of from 5 to 30% of the composition is satisfactory for most fire-retardants. Most often, an amount in the range of 10 to 20 weight percent is used.

In the application of the decorative composition, the flock agents, adhesives and the resin are usually intermixed in a dry state prior to application. Air is employed to propel the mixture and the stream of material is directed into contact with a spray of water, prior to the contact of the surface to be coated. If a fire-retardant is desired, the fire-retardant would likewise be intermixed with the mixture. If a fire-retardant is not desirable, a small amount of an acidic compound, such as the fire-retardants discussed above is included in an amount of around one percent or so to serve as the catalyst for the resin.

A sufficient amount of water must be used to wet the composition. Generally, the amount of water employed is an amount of 2 to 8 times the weight of the flock. If there is insufficient water, for example, less than one pound of water per pound of flock, the coating may not have the desired water-proofing characteristics. It is not necessary to intermix the composition with a particular amount of water at time of application. The water may be applied at any time before the applied mixture has dried.

The type of coating surface obtained upon application of the composition may also be controlled by the amount of water employed in the application. A soft fluffy surface is obtained when relatively small amounts of water are used, while a firm crusty surface is obtained with large amounts of water. Thus, it is possible by varying the amount of water to obtain decorative coverings having different type of surface characteristics and appearances. For example, a relatively soft coating may be obtained by using one or two or even less than one pound of water per pound of flock and, after the flock has been applied, the surface may be sprayed lightly with water resulting in the formation of a relatively crusty water-resistant surface with a soft fluffy base. When it is desirable to obtain a fluffy appearance, the decorated article can be sprayed with the composition containing sufficient amount of water to obtain a hard crusty waterproof coating as the undercoating and then apply a finish coat with less water which will give a soft fluffy surface to resemble freshly fallen snow.

The term "water-resistance" or "moisture resistance," as used herein, means a composition which, when applied to articles such as a Christmas tree and the like will retain its form and texture and adhere to the article when exposed to rain, snow, dew and other forms of moisture normally encountered under atmospheric conditions.

To further illustrate the invention, a series of blends containing various ratios of the constituents were made and branches of silver fir were sprayed using a commercial flocking machine. The composition mixture was propelled by an air stream, while water was simultaneously sprayed through a second nozzle. The two streams impinged about a foot from the gun and wet the adhesive containing mixture to have the flock stick to the tree branch. Enough water was used to thoroughly wet the flock. After the flock had dried, the appearance of the composition and the resistance to water was determined.

The flock agent used was a sulfite pulp. The adhesive was starch and the fire-retardant was mono-ammonium phosphate. The resin was urea-formaldehyde.

In determining the water resistance, a water faucet was turned on to obtain a flow of about two gallons per minute. The flocked branch was held under the water and moved back and forth about three times per second. At the end of 15 and 60 seconds, the loss of flock from the branch was estimated.

A five minute submersion test for water resistance was also conducted. This test was made on having the flock sprayed upon a sheet of glass to obtain about a three-quarter inch of the flock for each of the formulations, and allowed to dry. The samples were then immersed in water and held underwater for five minutes. After that time, the samples were observed to see the conditions of the flock.

The results obtained are shown in the table below and are compared to the results obtained where no resin was used.

| Sample | Flock, wt. percent | Adhesive, wt. percent | Fire Retardant, wt. percent | Urea Formaldehyde, wt. percent | Adhesion | Appearance | Five Minute Water Soak | Five Second Water Wash | 60 Second Water Wash |
|---|---|---|---|---|---|---|---|---|---|
| 1 | 68 | 19 | 12 | 1 | Good | Wet Snow | 30% of the surface hard and crusty. | Hard | 20% off. |
| 2 | 73 | 12 | 12 | 3 | do | do | 40% of the surface hard and crusty. | do | 5% off. |
| 3 | 72.4 | 10 | 12.8 | 4 | do | do | 45% of the surface hard and crusty. | Hard to firm. | Firm to soft. |
| 4 | 68 | 15 | 12 | 5 | do | do | 50% of the surface hard and crusty. | do | Firm. |
| 5 | 68 | 15 | 12 | 5 | do | do | All of surface remained hard, about 50% of surface wet. | Firm | Firm to soft. |
| 6 | 63 | 15 | 12 | 10 | do | do | Hard surface, not wet | Hard | Hard to firm. |
| 7 | 63 | 15 | 12 | 10 | do | do | do | do | Do. |
| 8 | 68 | 5 | 12 | 15 | Fair | do | 90% hard crust | do | Hard. |
| Blank 1 | 68 | 20 | 12 | | Good | do | Wet completely easily, removed | Soft | 95% off. |

I claim:
1. A process for the application of a decorative coating composition upon an article, which comprises impinging upon a stream of the decorative coating composition a water stream in an amount of from 2 to 8 times the weight of the decorative coating composition and directing the wetted coating composition to impinge upon the surface of the article to be coated, said decorative composition comprising, intermixed in dry form, a flock agent, from 5 to 25 weight percent of a water-soluble adhesive selected from the group consisting of starch and dextrin, and a water-soluble urea-formaldehyde resin in an amount of from 1 to 15 weight percent.

2. A process according to claim 1 wherein the adhesive is starch.

3. A process according to claim 1 wherein the amount of water used is from 3 to 6 times the weight of the decorative coating composition and the urea-formaldehyde resin is present in an amount of from 3 to 10 weight percent in the decorative coating composition.

4. A process according to claim 3 wherein the adhesive is starch.

5. A process for the application of a decorative coating composition upon an article which comprises impinging upon a stream of the decorative coating composition a water stream in an amount of from 2 to 8 times the weight of the coating composition and directing the wetted decorative composition to impinge upon the surface of the article to be decorated, said decorative coating composition comprising, intermixed in dry form, from 5 to 25 weight percent of a water-soluble adhesive selected from the group consisting of starch and dextrin, from 1 to 15 weight percent of a water-soluble urea-formaldehyde resin, 5 to 30 weight percent of a fire retardant, and the remainder a flock agent.

6. A process for the application of a decorative coating composition upon an article, which comprises impinging upon a stream of the decorative coating composition a water stream in an amount of from 3 to 6 times the weight of the coating composition and directing the wetted decorative coating composition to impinge upon the surface to be decorated, said decorative composition comprising, intermixed in dry form, 5 to 15 weight percent of a water-soluble adhesive selected from the group consisting of starch and dextrin, from 3 to 10 weight percent of a water-soluble urea-formaldehyde resin, from 10 to 20 weight percent of a fire retardant, and the remainder a flock agent.

7. A process according to claim 6 wherein the adhesive is starch and the flock agent is a pulp flock.

8. A dry decorative coating composition in particulate form, which comprises, intermixed in dry form, a flock agent, from 5 to 25 weight percent of a water-soluble adhesive selected from the group consisting of starch and dextrin, and from 1 to 15 weight percent of a water-soluble urea-formaldehyde resin.

9. A composition according to claim 8 wherein the urea-formaldehyde is present in an amount of from 3 to 10 weight percent, and the adhesive is starch.

10. A dry decorative coating composition in particulate form, which comprises, intermixed in dry form, from 5 to 25 weight percent of a water-soluble adhesive selected from the group consisting of starch and dextrin, from 1 to 15 weight percent of a urea-formaldehyde resin, from 5 to 30 weight percent of a fire retardant and the balance a flock agent.

11. A composition according to claim 10 wherein the water-soluble adhesive is a pre-gelatinized starch and is present in an amount of from 5 to 15 weight percent, the urea-formaldehyde is present in an amount of from 3 to 10 weight percent, and wherein the fire-retardant is a monobasic phosphate salt and is present in an amount of from 10 to 20 weight percent.

References Cited
UNITED STATES PATENTS

| | | | |
|---|---|---|---|
| 1,881,345 | 10/1932 | Beatty et al. | 117—27 X |
| 1,978,125 | 10/1934 | Bennett | 117—27 |
| 2,178,358 | 10/1939 | Howald et al. | 117—27 |
| 2,385,714 | 9/1945 | Le Piana | 117—161 X |
| 2,414,313 | 1/1947 | Leek | 117—155 |
| 2,422,118 | 6/1947 | Meyer | 260—39 |
| 2,423,185 | 7/1947 | Gundell et al. | 117—161 |
| 2,466,450 | 4/1949 | Levinson | 260—39 X |
| 2,495,540 | 1/1950 | Nichols et al. | 117—27 X |
| 2,940,863 | 6/1960 | Bennett et al. | 117—161 X |
| 3,021,079 | 2/1962 | Sovia et al. | 117—105.5 X |
| 3,182,031 | 5/1965 | Bauer et al. | 260—17.3 |
| 3,223,329 | 12/1965 | Ross et al. | 117—27 |
| 1,945,714 | 2/1944 | Winogradow | 117—38 X |
| 1,924,181 | 8/1943 | Cutler | 117—38 |

OTHER REFERENCES

J. E. Killinger, Section of the Technical Association of the Pulp and Paper Industry, Nov. 4, 1943, pages 201–206.

A. L. Phillips, Flock Finishing . . . Part III, December 1952, pages 18–21 (Organic Finishing).

WILLIAM D. MARTIN, *Primary Examiner.*

P. F. ATTAGUILE, *Assistant Examiner.*